US009633380B2

(12) United States Patent
Zdorovtsov

(10) Patent No.: US 9,633,380 B2
(45) Date of Patent: Apr. 25, 2017

(54) METHOD AND SYSTEM FOR THIRD PARTY BROKERED AUTHENTICATION OF RECIPROCITY OF INTEREST

(71) Applicant: Volodymyr Zdorovtsov, Shrewsbury, MA (US)

(72) Inventor: Volodymyr Zdorovtsov, Shrewsbury, MA (US)

(*) Notice: Subject to any disclaimer, the term of this patent is extended or adjusted under 35 U.S.C. 154(b) by 411 days.

(21) Appl. No.: 14/477,205

(22) Filed: Sep. 4, 2014

(65) Prior Publication Data

US 2015/0066749 A1  Mar. 5, 2015

Related U.S. Application Data

(60) Provisional application No. 61/873,759, filed on Sep. 4, 2013.

(51) Int. Cl.
| | | |
|---|---|---|
| *G06F 3/048* | (2013.01) | |
| *G06Q 30/02* | (2012.01) | |
| *G06Q 50/00* | (2012.01) | |
| *G06Q 20/10* | (2012.01) | |
| *G06Q 20/38* | (2012.01) | |

(52) U.S. Cl.
CPC ......... *G06Q 30/0279* (2013.01); *G06Q 20/10* (2013.01); *G06Q 20/3821* (2013.01); *G06Q 50/01* (2013.01)

(58) Field of Classification Search
CPC .................................................. G06Q 30/02
USPC ................................. 715/758, 715
See application file for complete search history.

(56) References Cited

U.S. PATENT DOCUMENTS

| | | | |
|---|---|---|---|
| 5,950,200 A | 9/1999 | Sudai et al. | |
| 6,735,568 B1 | 5/2004 | Buckwalter et al. | |
| 7,085,806 B1 | 8/2006 | Shapira | |
| 7,203,674 B2 | 4/2007 | Cohen | |
| 8,583,563 B1 | 11/2013 | Bonilla et al. | |
| 2005/0171832 A1* | 8/2005 | Hull ................... | G06Q 30/0201 705/7.29 |
| 2007/0286383 A1* | 12/2007 | Fan ..................... | H04M 3/4228 379/201.01 |
| 2008/0147743 A1* | 6/2008 | Taylor .................. | G06Q 30/02 |
| 2008/0172485 A1 | 7/2008 | Du | |
| 2011/0219310 A1* | 9/2011 | Robson ................. | G06Q 10/06 715/733 |
| 2012/0072382 A1 | 3/2012 | Pearson et al. | |
| 2015/0149346 A1* | 5/2015 | Parikh ................ | G06Q 30/0279 705/39 |
| 2015/0334065 A1* | 11/2015 | Yan .................... | H04M 1/72552 709/206 |

FOREIGN PATENT DOCUMENTS

| | | |
|---|---|---|
| WO | WO2005013079 A2 | 2/2005 |
| WO | WO2009086121 A1 | 7/2009 |

* cited by examiner

*Primary Examiner* — William Rankins
(74) *Attorney, Agent, or Firm* — Intrinsic Law Corp.

(57) ABSTRACT

A device-implemented method and multi-component system are described. The method and system enable the selection of a charity to receive donations from persons interested in one another, and further enables a subject who is the target of interest from an initiating party to confirm the sincerity of the initiating party by third party brokered transactions that quantitatively demonstrate the substantive interest of the initiator. The initiator is also able to confirm the genuine interest by his or her target recipient in that the initiator and the recipient can set minimum donation level thresholds that must be met before their identities are confirmed.

6 Claims, 3 Drawing Sheets

METHOD AND SYSTEM FOR THIRD PARTY BROKERED AUTHENTICATION OF RECIPROCITY OF INTEREST

RELATED APPLICATIONS

The present application is related to and claims the priority of U.S. Provisional Application No. 61/873,759, entitled "Method and System for Using Charitable Donations to Authenticate the Genuineness of Feelings or Interest and Confidentiality Determining Reciprocity," filed on Sep. 4, 2013, which is hereby incorporated by reference.

TECHNICAL FIELD

The present disclosure relates to authentication of interest between two parties and automated brokering of charitable donations by two parties in the context of substantiating a reciprocal interest between the two parties.

BACKGROUND

The Internet has facilitated social and commercial interactions of all sorts. While clubs and social venues have served to introduce people to one another for a long time, the Internet opened up new means for communication among strangers as well as among friends, acquaintances and other people who already know one another. Various services exist to help people meet others and form relationships online and offline. These usually offer a menu of detailed profiles for browsing, search functionality, and, sometimes, match-making algorithms that maximize the likelihood of a successful relationship based on estimated compatibility. Most such services are designed for individuals who are looking to find someone they don't already know. A small number of systems provide methods for matching parties who already know each other but due to shyness, fear of rejection, or other constraints, prefer to remain anonymous until they determine the feelings are mutual. These systems allow users to identify others they have interests in and, in cases of matches, disclose the identities to the respective individuals.

One limitation of the prior art is that the existing methods do not prove or substantiate the true nature of the indicated feelings. Thus, if individual X has feelings toward individual Y, but is unable to confirm the true nature of such feelings when revealing them anonymously, Y may not take this indication seriously and may choose not to respond for fear of disclosing their genuine feelings to someone who didn't truly feel the same way about them. Furthermore, knowing that there is no way to validate the responder has genuine feelings, individual X may not send any indications to Y in the first place. Consequently, while existing solutions claim to help people who are hesitant to initiate contact because of shyness, risk of embarrassment, fear of rejection, or other societal constraints, they don't provide a setting which fully overcomes these barriers.

Figure 1:
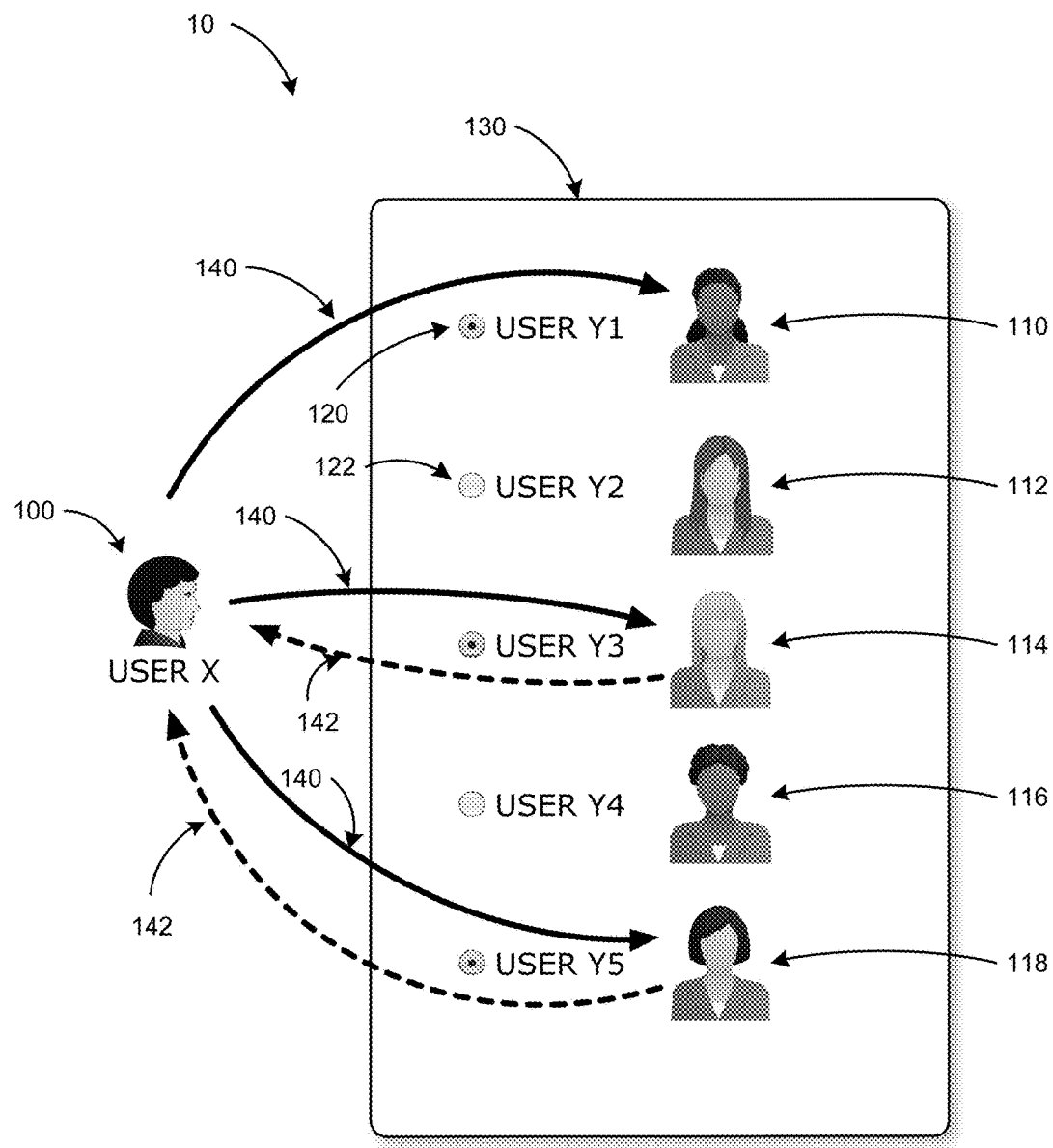

FIG. 1 illustrates a social meeting and communication (e.g., dating) service 10 as it exists in most current services. The service 10 is usually implemented as a web-based site requiring users to sign up for a membership, provide personal profile information and log in to in order to use the service. A database connected to a server holds the information regarding each member of the service. Typically, a member can search for new acquaintances or love interests from the information in the database using filtering criteria (e.g., by gender, age, race, hobby, profession, proximity, and other information). The full personal contact data of the members is not usually revealed to the other members for privacy reasons, but rather, a pseudonym and set of photos and profile data may be made available. Once members are introduced and mutually interested in one another they can of course exchange their full personal information, meet in person, and so on.

Materially for the present purpose, a User X 100 signs in to the service and searches for potential subjects as provided by the service. A set of members (we will refer to them as Users Y1, Y2, Y3, Y4, Y5) 110, 112, 114, 116, 118 matching User X's interests are presented at 130, for example in a browser window. User X can then select one or more matching Users Y which meet more particular criteria from those presented in 130. In the example shown, User X selects a definite interest in Users Y1, Y3 and Y5. This can be done using any traditional computer interface means, such as a radio button or check box. We see that three of the Users Y are selected by User X and their corresponding radio buttons 120 are selected. User X was not particularly interested in User Y2 or User Y4, and their radio buttons 122 are thus not selected.

According to conventional online introduction or dating services, once User X has indicated an interest in one or more Users (Y1, Y3, Y5) a message 140 is sent from User X, through the service, to the selected Users Y. The selected Users Y receive the message indicating that a member of the service (User X) is interested in them. Users Y are then able to review the stored profile information regarding User X. If a User Y is interested in User X and would like to proceed to the next step of communication and introduction, User Y (e.g., Y3, Y5) can send a reply message 142 back to User X, through the service, indicating some mutual interest. The rest is up to the users to continue or not continue to develop their relationship. It is clear in this example that User X can allege an interest in a large number of Users Y, which is not generally checked by the service or by Users Y. Also, multiple reciprocal interests can be alleged leading to disappointment or a loss of credibility in the genuineness of messages 140, 142 regarding interest in a subject. Such services do not provide a test of the real measure of interest among people who have a basis for being interested in one another, previously know each other, nor do they provide a quantitative level of interest by one user in another.

As can be seen, there is a need for a method to help authenticate or substantiate the true nature of indicated feelings of interest. Without it, a user of such systems is left largely in the same position of being reluctant to take the first steps in a relationship. Current services catering to a many-to-many paradigm are not well suited for users who have a genuine and pre-existing interest in another particular user but need help taking steps to show their interest and to gauge the reciprocal interest by the other party as well.

SUMMARY

An embodiment of the present invention is directed to a computer-implemented method for substantiating an interest of a first party and a second party in one another, comprising providing from an application server to a first client device of a first party data for generating a displayable output on said first client device representing options that can be selected by said first party, providing said data for generating a displayable output comprising providing data for inclusion in a displayable user interface capable of receiving input from said first party; receiving, at said application server, from the first party's client device by way of said user interface, initiator identification information identifying said first party to the application server; storing said initiator identification information identifying said first party in a memory device coupled to said application server; receiving, at said application server, from the first party's client device by way of said user interface, target identification information identifying a second party in which said first party expresses interest; storing said target identification information identifying said second party in said memory device coupled to said application server; receiving, from said first party, from the first party's client device by way of said user interface, a first threshold amount that said first party chose as a minimum threshold for demonstration of interest by said second party in said first party; storing said first threshold amount in said memory device coupled to said application server; providing to said first party additional data, including data for displaying on said first client device of the first party, a list of entities to which a charitable donation may be made in connection with said first party's interest in said second party; receiving from said first party a selection of one of said list of entities from said first party indicating a selected charity to which a charitable donation is to be made; receiving from said first party an amount of a donation by said first party to be made to said selected charity to substantiate an interest of said first party in said second party; receiving from said first party payment credential information of said first party and brokering payment from said first party, in said amount of donation by said first party, to said selected charity; sending, from said application server to said second party an indication that another party has expressed interest in said second party, without disclosing the identity of the first party to the second party, including sending to said second party confirmation that said first party has substantiated its interest in said second party by way of a charitable donation to said selected charity; receiving, from said second party a response indicating whether said second party has a subject of interest, and whether the subject of the second party's interest is said first party; receiving from said second party an amount of a donation by said second party and second party payment credentials so as to process a donation by said second party to said selected charity; receiving from said second party a second threshold amount that said second party chose as a minimum threshold for demonstration of interest by any party in said second party; storing said second threshold amount in said memory device coupled to said application server; and if (a) said donation by said first party meets or exceeds the second threshold chosen by said second party and (b) said donation by said second party meets or exceeds the first threshold chosen by said first party, and (c) said second party's subject of interest is said first party, confirming to both the first and second parties that a successful match has been found.

In another aspect a system that brokers donations to eligible charities while assisting persons interested in one another to be introduced is provided. The system includes an application server providing output to client device displays, including user interface elements that can display to client users information and receive information from the clients.

IN THE DRAWINGS

The drawings included herewith represent exemplary and preferred embodiments of the present invention. They are not to be considered limiting or as a substitute for the scope of the claims hereof. Those skilled in the art will appreciate simplifications made for the sake of brevity and clarity, as well as variations to the specific configurations of the present drawings and examples.

Figure 2:
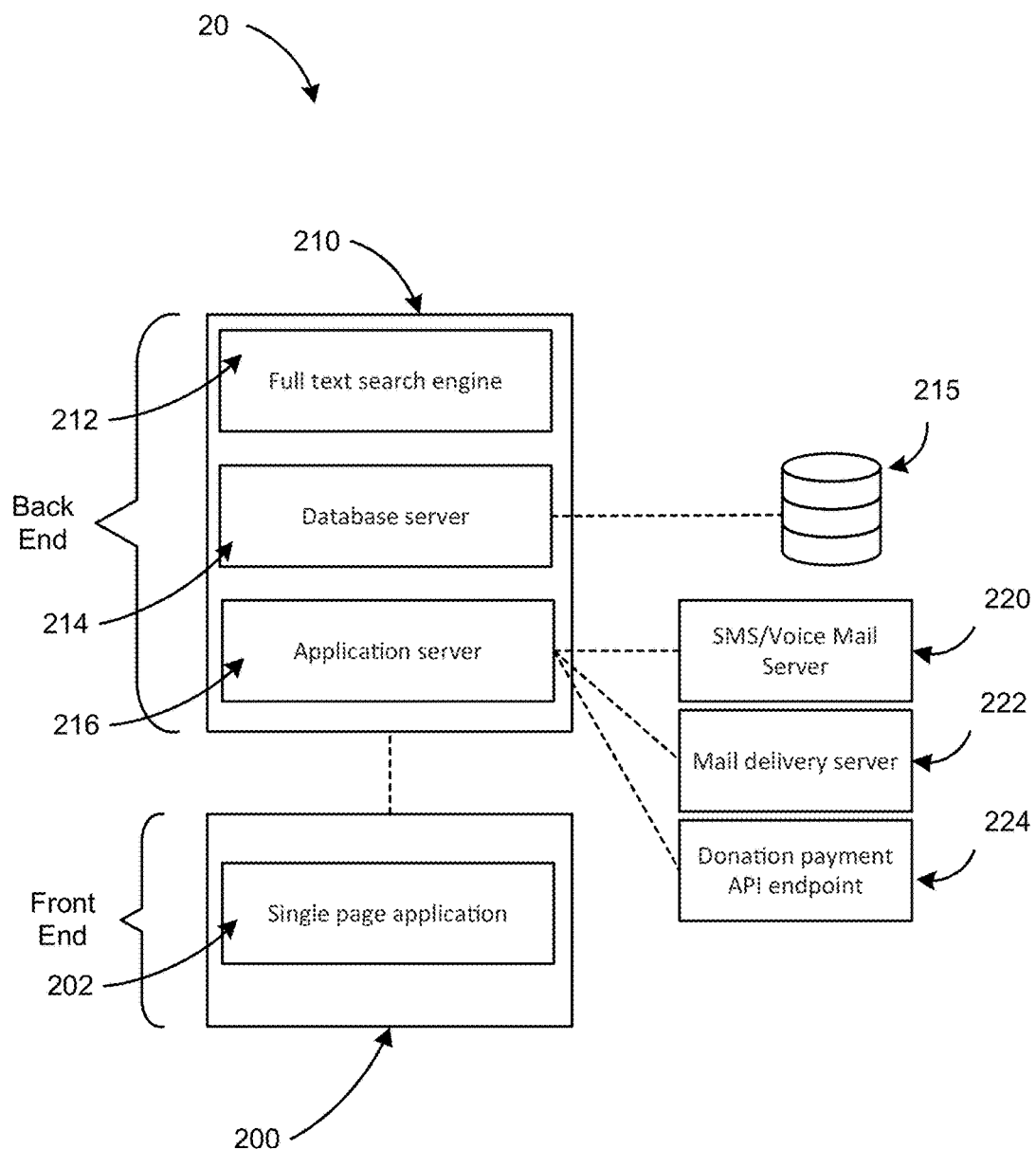
Figure 3:
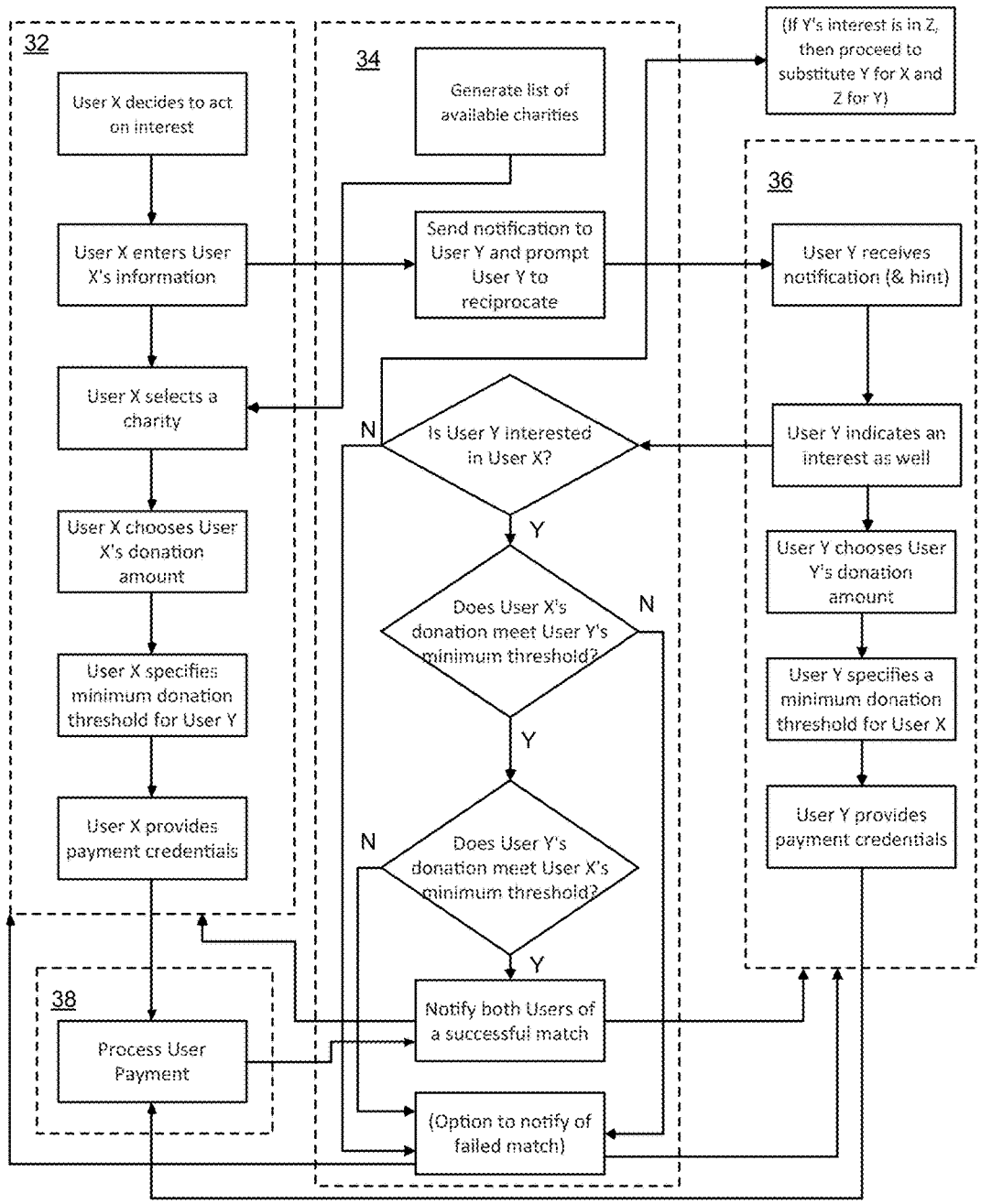

FIG. 1 illustrates a prior art online meeting service;
FIG. 2 illustrates an exemplary embodiment of the present system; and
FIG. 3 illustrates an exemplary process for brokering donations and substantiating the interest of two parties in one another.

DETAILED DESCRIPTION

As mentioned above, a problem with prior art computerized social connection tools (including online dating and introduction sites) is that they generally allow members to indicate an interest in one another without any way to authenticate a genuine interest in one another. For most cases of conventional services of this type, a party merely needs to send a message or other electronic indication to another party to allege an interest in him or her. Also, since members of such services generally pay a monthly fee for their membership, they are generally free to send as many messages or notifications (signaling) of alleged interest to as many other recipients as they can, which does not bode well for the sincerity of their feelings to the recipient of such messages or notifications. Finally, in the case of a lack of mutuality of interest, conventional services fail to properly protect the anonymity of the person sending the initial message or indication of interest, which can lead to awkward or unwanted exposure of their feelings to the person who does not reciprocate these feelings. This can be especially problematic if the persons in question are co-workers, classmates, neighbors or otherwise cross paths on a regular basis, which can be difficult for the initiator of contact who exposed his or her feelings but did not receive a positive response to their approach.

An automated method and system is presented to enable electronic signaling between parties having an interest in one another (whether this interest is mutual or not). For the present purposes we can call the first person who initiates the process as "X" and the second person who is the subject of the first person's interest as "Y." Conventionally, X would of course only be able to guess whether Y is also interested in X, or interested in X in the same way and extent that X is interested in Y, which we call a reciprocity of interest. In an aspect, the present method and system allow for a quantitative determination of the interest of each of the parties in the other while providing charitable donations to worthy causes and organizations. Optionally, charities are provided from a list including charity ID numbers or identifiers, and the list can contain all active charities in a third party database, or charities participating in the present service, but this is not required.

FIG. 2 illustrates an exemplary architecture 20 for a system offering the services and carrying out the presently disclosed methods. This architecture can be implemented in a number of ways as would be apparent to those skilled in the art. For example, the implementation could replace some components, elements or modules by others of equivalent functionality. Also, certain functions can be implemented alternatively in software, hardware, or firmware. The present architecture is not intended to be limiting as to such design choices. Additionally, as to co-location of certain components, this may also be a design choice. A data storage unit, memory device or database could be located in or at a computing server machine, connected thereto and in proximity therewith, or remotely but accessibly coupled over a data connection line. The choice of computing and communication equipment to carry out the present methods is also a matter of design choice. In a preferred implementation, the architecture 20 permits authorized access over an Internet connection to a server such as a desktop computer system having a processor executing the service's software application instructions on top of a computer operating system such as Windows, Linux, Unix, Apple Macintosh OS or others.

In the illustrated example, a front end 200 is coupled to a back end 210 of the service. The front end 200 offers a single page application 202 that can be served to client computers or mobile computing devices such as tablets and smartphones. The single page application (SPA) 202 is in some embodiments an application that generates all of its pages using JavaScript.

The back end 210 includes an application server 216 on which the service's software functions are run. The back end also includes a database server 214 that is in data communication with a database 215 containing stored information needed to process requests and return results to the rest of the system. Also, a full text search engine 212 allows searching based on text entries by users of the system.

The application server 216 has access to services and servers as well. These can include a SMS and/or voice mail server 220 providing messaging by SMS or voice mail modalities, a mail delivery server 222 providing e-mail messaging functionality, and a donation payment application program interface (API) endpoint 224, which provides connection from the system to a donation payment processing service. The present messaging or signaling or notifications can be in the form of any electronic message, electronic data file formatted to suit its function, including e-mail, SMS, phone message, electronic attachment files, or the like.

In operation, the present service is run on a computing platform and communications architecture, preferably as an online electronic service involving a computing device of one or more users acting as clients (e.g., User X, User Y from the earlier example). The clients connect to the service over a communication connection such as an Internet connection, which may be wired or wireless and may involve a local or wide area network connection and associated hardware and software. The connections may carry out communications using any suitable communication protocol such as TCP/IP, 802.11, or cellular communication protocol and infrastructure.

FIG. 3 illustrates an exemplary process or method for carrying out the present service and major components thereof. The overall architecture includes a User X client 32, User Y client 36, Application Server 34 and Payment Server 38. The Application Server 34 and optionally Payment Server 38 act as a third party broker for communications among the users, servers, payment processors and charitable recipients. The outcome can be successful for the initiator of the process, or not. In either case, at least one chosen charity will receive a donation.

The steps of the process do not all have to take place in the order shown, and some steps can take place in advance of the initiation of interest by one party in another (e.g., when they sign up for the service, but this is not required). Other steps can take place in parallel with other steps. The detailed implementation includes some design flexibility as would be understood by those skilled in the art.

User X typically initiates the present process by indicating an interest in a particular person (User Y). User X either subscribes to a service and can log in and has a known profile and user information, or User X can be a non-registered user who enters their information as required for the system to carry out its functions. In any case, User X would identify itself to the service by entering User X (initiator or first party) identification information (e.g., name, email address, phone number, etc.) or by logging in with a user name and/or password. The initiator identification information will be sent from a user interface on a display of User X's device (e.g., a tablet or smartphone) to the application server and will be stored in a memory unit there or on a connected database holding this information. The contents of the memory unit are modified or replaced with new data containing this initiator identification information. The users of the service can access the system through a variety of devices, communication services and user interfaces. In an embodiment, the users access the system through a web browser at a given URL. In another embodiment, the users access the service through a user interface of a mobile communication device application (or app). A user can view information on the screen of his or her device, and can enter information required by the application into text entry boxes or other radio buttons, pull down menus and so on in a single or multiple window interface. One embodiment simplifies the display to the user by presenting discrete information and requiring discrete responses from the user in a single screen, then providing a "NEXT" button taking the user to the following screen to process the following steps. Therefore, the application server can generate data including page generation data that enables viewable displayable page outputs to be sent to the client devices of the parties using the service. In an embodiment, the application server contains or is connected to a page generator that generates output page files in a format suited for display on the client devices. The formatted output pages are sent over a communication connection (e.g., the Internet) from the application server to the parties' client devices using a communication protocol. User X therefore enters into a user interface of a first client device identification information that the Application Server stores that identifies the first party (initiator or User X) as well as a second party of interest (target or User Y).

Once User X is logged in, registered, authenticated, or identified to the server, and the first user (User X, or initiator) has indicated an interest in a second party (User Y, or target party), the server presents User X with options by way of the display on User X's client device. User X selects a charity to receive User X's initial donation. The selection of a charity can be made by typing in the full name or partial name or search term, which would be processed by the system's text search engine described above. Alternatively, in an embodiment, the Application Server is coupled to a database and/or server providing the identities of available charities. The list of available charities can then be made to users (e.g., User X) to choose from. Still alternatively, in an aspect, the users can choose some criteria for their donation and a partial set of charities meeting the criteria would be presented to choose from. In the end, User X selects a charity to which his initial donation is directed, and User X also enters the amount of their donation. Accordingly, Application Server 34 may have access to, include, or be in communication with a database of charitable entities equipped to receive donations processed through the present service. In an aspect, a user can be guided to see more information about a charity listed such as its tax ID number, address, mission statement, and other particulars of the charity. In yet another aspect, the charities can be grouped by type or can be listed according to popularity, size, or another criterion.

Additionally, User X specifies a minimum threshold amount that User Y must meet to demonstrate a sincere substantiated return interest in User X (reciprocating User X's interest). The system stores the donation details and amounts for use in the steps to follow.

User X provides their payment credentials, e.g., bank account information, credit card information, or other financial data as needed to process and authorize payment. Accordingly, a Payment Server 38 can be coupled to a financial transaction processing network, including banks, credit card companies, or other secure payment processors (e.g., PayPal® and the like). In an embodiment, the system suggests donation amounts (for example in $100 increments) and the user can just click or select the donation amount. In another embodiment, the user can enter the amount of the donation by typing the amount into a text entry box. In yet another aspect, the system can dictate an minimum and/or maximum donation amount to avoid mistakes or inappropriate amounts from being selected.

A Payment Server 38 can now process User X's donation to the selected charity. While the example shows the flow from User X to the Payment Server 38, the Application Server 34 through an API can be used to communicate the details of User X's donation to the Payment Server 38. In an aspect, an electronic file containing user identifying information as well as identifying the selected charity as well as indicating payment amounts and payment credentials are generated by the Application Server and sent to the Payment Server. Payment Server 38 will handle delivery of User X's donation to the stated charitable organization and will also handle any administrative fees or charges that are sometimes associated with processing payments to the target charity. Likewise, the operator of the service, or owner of Application Server 34 can charge a nominal fee for the service, which can be a membership or subscription fee, or a percentage of the donation amount, or a success fee for successful connections, etc. The operators can furthermore develop revenue from data mining of useful information for commercial purposes or from advertising or other sources of income generated by their relationship with and access to the service's users. It should be noted that, in an aspect shown by the arrow from the Payment Server 38 to the Application Server 34, the notifications and actions by the Application Server are contingent on confirmed processing of the donation payments. Therefore, in this aspect, no notifications or matching take place until proper authenticated donation payments have been made by the respective parties to the selected charity.

Having made a donation substantiating User X's interest in User Y, and having provided the Application Server 34 with the contact information of User Y, the system sends a notification to User Y that a currently-undisclosed party has expressed a genuine interest in User Y. In one example, the system can provide the details of User X's initial donation to User Y. For example, the system can inform User Y that a donation was made to a certain charity and/or inform User Y of the amount of the donation. In yet another aspect, the system can optionally include a brief message or hint from User X to User Y to get User Y's attention or to help User Y decide if such an approach may be of interest to User Y. For example, User X may send a brief note such as "We get off at the same subway stop" as a teaser or playful hint that User Y can consider. The hints can also be a way to assure the target User Y that the message they received regarding someone having a crush on them is not "spam" or junk mail. The system prompts User Y to now take action and respond to the initial approach and donation of User X. If User Y declines to act in response to the invitation (for example, if User Y is already in a relationship or otherwise not interested in a relationship) then no further measures would be taken by the system. If however, User Y has an interest in some party (which may be User X) then the following steps take place.

Note that User Y can make its donation to the same selected charity as was selected by User X, or, in alternative embodiments, User Y can make a donation to a different charity that User Y specifies or selects in a way similar to that which User X used to select its charity. That is, the parties do not need to both donate to the same charity.

User Y will indicate if they have an interest in (someone) as well. If so, User Y will indicate to the Application Server 34 who the subject of their interest is. Additionally, User Y will specify the minimum threshold for the other party's donation in order to substantiate the other party's interest in User Y. This threshold is a subjective criterion and can be motivated by many factors including the Users' financial situation and the level of commitment each has to their interest in the other party. If User X is lucky, then User Y indicates that they have an interest in User X. The system then confirms that both User X is interested in User Y and User Y is interested in User X, even though their identities have not yet been disclosed to one another.

A successful match is announced to User X and User Y if they have both indicated to the Application Server 34 an interest in one another and if each User has met the other User's minimum threshold donation amount substantiating their genuine interest in a quantitative way. The announcement of the successful match can be in the form of any electronic message, including e-mail, SMS, phone message or the like. The announcement would identify each party to the other so as to confirm their identities to one another. Now, having achieved a successful match and having proven a genuine and substantiated reciprocity of interest in one another, the parties can communicate, meet in person, and so on.

As stated earlier, an aspect of the current service is that the system aids in authenticating or substantiating the genuine interest of the parties in one another. Here, if User X's donation meets or exceeds User Y's stated minimum threshold of interest, then the process proceeds. If not, then User Y and User X would not have exhibited sufficient commitment to their interest and the system can notify the parties that there was not a proper match. Similarly, if User Y states an interest in someone but it is not User X then the system would deliver some indication to the parties that they had not successfully made a match.

If the process does not result in a successful match, e.g., User Y did not indicate an interest in User X, or one of the parties failed to make a donation sufficient to quantitatively demonstrate the level of interested required by the other, the system may carry out one of a few actions. In one embodiment, the system will keep the results of User Y's response in confidence and will not tell User X why there was no successful match, to preserve User Y's privacy. In another embodiment, the system can inform User X why no successful match was achieved (insufficient donation, no reciprocation of interest from User Y, etc.)

In yet another embodiment, if User Y indicates an interest in someone (User Z), i.e., that someone was not User X, the system and process can optionally start over with User Y being considered the initiator and User Z being considered the target of Y's interest. In other words, with regard to FIG. 3, the service can essentially substitute User Y for User X and User Z for User Y in the present example, and so on.

This process can be repeated if Z in turn expresses an interest in yet another party, W.

Note that in the event a successful match is not achieved, the system can optionally include other inducements to compensate for any disappointment. For example the system may suggest to the parties that they reconsider their targeted "crush" or that they make a slightly more committed donation, or some other creative way to make a connection or achieve a more satisfying outcome. But such other steps are not required by each embodiment as presented.

An additional option is to enforce an added measure of commitment including a time to participate again in the above process. The system may store the date on which a user (e.g., User X) "plays" the service. Then, User X may not be allowed to participate in the service as an initiator for a duration of time determined by the system or another factor. For example, if User X is the initiator of an attempted contact, User X could be blocked from initiating another contact for a period of at least one week, one month, or another set time period. This is to avoid a situation where a person of means (financially capable of sending repeated contact attempts) to one or more targets more often than deemed sincerely reasonable.

Therefore, among other aspects, the present method and system allows individuals who have feelings towards or interest in others to confidentially help substantiate the genuineness of their feelings or interest and for determining reciprocity, disclosing the identities to the matched parties only if the genuineness is mutual.

The preceding and following discussion therefore summarizes various aspects disclosed herein by way of illustration of preferred embodiments, but not by way of limitation. The appended claims are intended to delineate the scope of the present invention.

In an exemplary embodiment of the present invention, a computer system receives input from the user, identifying the object of their interest. The user is then prompted to select a charity, make a significant donation, and specify a minimum threshold amount. The threshold amount is the minimum amount that must be donated by whoever has feelings towards him or her before the user's identity is revealed in case of a match. The object of interest is notified about an undisclosed person's interest in them and about the details of the donation made by the latter to signify the genuineness of the interest. The recipient is prompted to use the system if he or she has similar interest in or feelings towards someone and informed of the minimum donation threshold specified by the original sender that must be met or exceeded in order to ensure the genuineness is mirrored. If the recipient uses the system, indicates as their object of interest the original sender and the two donations meet or exceed the other party's respective minimum donation thresholds, the identities are revealed to both parties. If the recipient specifies another person, the process continues as per the above with the latter now being the new recipient.

Embodiments of the present invention provide an unambiguous way for each part to substantiate the seriousness of the message they are sending to the recipient. The charitable donation serves to validate the non-trivial nature of the indicated interest or feelings. For instance, the materiality of the amount is determined through self-calibration. To ensure their indication is taken seriously, each user will have an incentive to donate a sum that is significant to them, given their own individual circumstances. Likewise, the minimum threshold of materiality they will stipulate for the target to meet will reflect the user's knowledge of what is likely to be material to the recipient. Thus, a successful business executive will be motivated to donate a meaningfully different amount from that paid by a college student when signaling their feelings towards someone confidentially. Similarly, the amounts set for each as thresholds if they are on the recipient or target side would also reflect their circumstances accordingly. As an additional step in making sure the feelings or interests sent through the system are taken as genuine, embodiments of the present invention can require that a significant minimum length of time elapses before a user can use the system again to indicate feelings or interest towards a new recipient.

Embodiments of the present invention can be realized through various electronic devices. A computer system can be established to receive inputs, store them in a database, check for matches and send out notifications. This can be operationalized through a website, a smart phone application, or the like. Alternatively, embodiments of the present invention can be operationalized through an automated or staffed telephone-operated service.

In more generalized embodiments of the present invention, the user can simply use the service and make a significant charitable contribution to authenticate any message they want to convey, without the need for confidentiality. For example, rather than buying flowers and a card to say "I'm sorry" or "I care about you", the user can make a material charitable contribution to prove that he or she is indeed sorry or in love.

The present invention should not be considered limited to the particular embodiments described above, but rather should be understood to cover all aspects of the invention as fairly set out in the present claims. Various modifications, equivalent processes, as well as numerous structures to which the present invention may be applicable, will be readily apparent to those skilled in the art to which the present invention is directed upon review of the present disclosure. The claims are intended to cover such modifications.

What is claimed is:

1. A computer-implemented method for substantiating an interest of a first party and a second party in one another, comprising:

providing, from an application server to a first client device of a first party, data for generating a displayable output on said first client device representing options that can be selected by said first party, wherein providing said data for generating a displayable output comprises providing data for inclusion in a displayable user interface capable of receiving input from said first party;

receiving, at said application server, from the first party's client device by way of said user interface, initiator identification information identifying said first party to the application server;

storing said initiator identification information identifying said first party in a memory device coupled to said application server;

receiving, at said application server, from the first party's client device by way of said user interface, target identification information identifying a second party in which said first party expresses interest;

storing said target identification information identifying said second party in said memory device coupled to said application server;

receiving, from said first party, from the first party's client device by way of said user interface, a first threshold amount that said first party chose as a minimum threshold for demonstration of interest by said second party in said first party;

storing said first threshold amount in said memory device coupled to said application server;

providing to said first party additional data, including data for displaying on said first client device of the first party a list of entities to which a charitable donation may be made in connection with said first party's interest in said second party;

receiving from said first party a selection of one of said list of entities from said first party indicating a selected charity to which a charitable donation is to be made;

receiving from said first party an amount of a donation by said first party to be made to said selected charity to substantiate an interest of said first party in said second party;

receiving from said first party payment credential information of said first party and brokering payment from said first party, in said amount of donation by said first party, to said selected charity;

sending, from said application server to said second party, an indication that another party has expressed interest in said second party, without disclosing the identity of the first party to the second party, including sending to said second party confirmation that said first party has substantiated its interest in said second party by way of a charitable donation to said selected charity;

receiving from said second party a response indicating whether said second party has a subject of interest, and whether the subject of the second party's interest is said first party;

receiving from said second party an amount of a donation by said second party and second party payment credentials so as to process a donation by said second party to a charity from said list of entities to which a charitable donation may be made;

receiving from said second party a second threshold amount that said second party chose as a minimum threshold for demonstration of interest by any party in said second party;

storing said second threshold amount in said memory device coupled to said application server; and if (a) said donation by said first party meets or exceeds the second threshold chosen by said second party and (b) said donation by said second party meets or exceeds the first threshold chosen by said first party, and (c) said second party's subject of interest is said first party, confirming to both the first and second parties that a successful match has been made.

2. The method of claim 1, further comprising notifying said first and second parties of a failed match if any of the above conditions (a), (b), (c) are not met, but without notifying the parties of the reason for the failed match.

3. The method of claim 1, further comprising, if the second party indicates an interest in a third party other than the first party, substituting said first party with said second party in the method, and substituting said second party with said third party in the same method where the second party is now treated as the initiator and the third party is treated as the target.

4. The method of claim 1, further comprising determining whether said first user had participated in said method more recently than a pre-determined time interval, and if so, denying said first user from participating in said method.

5. The method of claim 1, further comprising generating an electronic file representing said indication sent from the application server to the second party, in a format suitable for display on a display of a second client device of said second party, and delivering said electronic file in said format to said second client device using an electronic communication protocol.

6. The method of claim 1, further comprising the application server generating an electronic file containing said first party payment credential information and information identifying said selected charity, and transmitting said electronic file to a payment server for processing of payment of funds in the amount of donation of said first party to said selected charity.

* * * * *